United States Patent [19]

Opprecht et al.

[11] Patent Number: 4,675,489
[45] Date of Patent: Jun. 23, 1987

[54] THROUGH GUIDE FOR ROUNDED BLANKS ON A SEAM WELDING MACHINE

[75] Inventors: Paul Opprecht, Bergdietikon; Othmar Stieger, Kindhausen, both of Switzerland

[73] Assignee: Elpatronic AG, Switzerland

[21] Appl. No.: 810,660

[22] Filed: Dec. 18, 1985

[30] Foreign Application Priority Data

Dec. 19, 1984 [CH] Switzerland ............... 6003/84

[51] Int. Cl.$^4$ ............................................. B23K 11/32
[52] U.S. Cl. ...................... 219/64; 219/61.3; 219/121 LC
[58] Field of Search ............ 219/59.1, 64, 61.1, 219/61.13, 61.3, 121 LC

[56] References Cited

U.S. PATENT DOCUMENTS

| | | | |
|---|---|---|---|
| 4,352,001 | 9/1982 | Ishibashi et al. | 219/64 |
| 4,525,617 | 6/1985 | Saito | 219/64 |
| 4,568,812 | 2/1986 | Panknin et al. | 219/64 |
| 4,577,088 | 3/1986 | Sharp | 219/64 X |

FOREIGN PATENT DOCUMENTS 3330171  2/1984  Fed. Rep. of Germany .

*Primary Examiner*—E. A. Goldberg
*Assistant Examiner*—C. M. Sigda

[57] ABSTRACT

On a machine for welding together the longitudinal edges (12, 14) of rounded sheet-metal container body blanks there are disposed a plurality of rings (24) of rollers round a common longitudinal axis (22), one behind the other in the direction of passage through (A) of the blanks (10). At least some (28) of the rollers (26, 28) of the rings (24) of rollers are each mounted on a roller carrier (40) which is adjustable in the direction away from the longitudinal axis (22) against resilient resistance. The roller carriers (40) are guided in a manner which enables the associated rollers (28) to execute yielding movements at an angle of distinctly less than 90° to the direction of passage through (A) of the blanks (10). For this purpose, the roller carriers (40) are each pivotable about a transverse pin (42) which is disposed at least substantially parallel to the associated roller spindle (38), upstream of this with respect to the direction of passage through (A) of the blanks (10). This guiding of the roller carriers (40) makes an important contribution to avoiding damage to the leading edges (16) of the blanks (10) and to reducing the noise occurring when these leading edges (16) impinge on the rollers (28).

6 Claims, 5 Drawing Figures

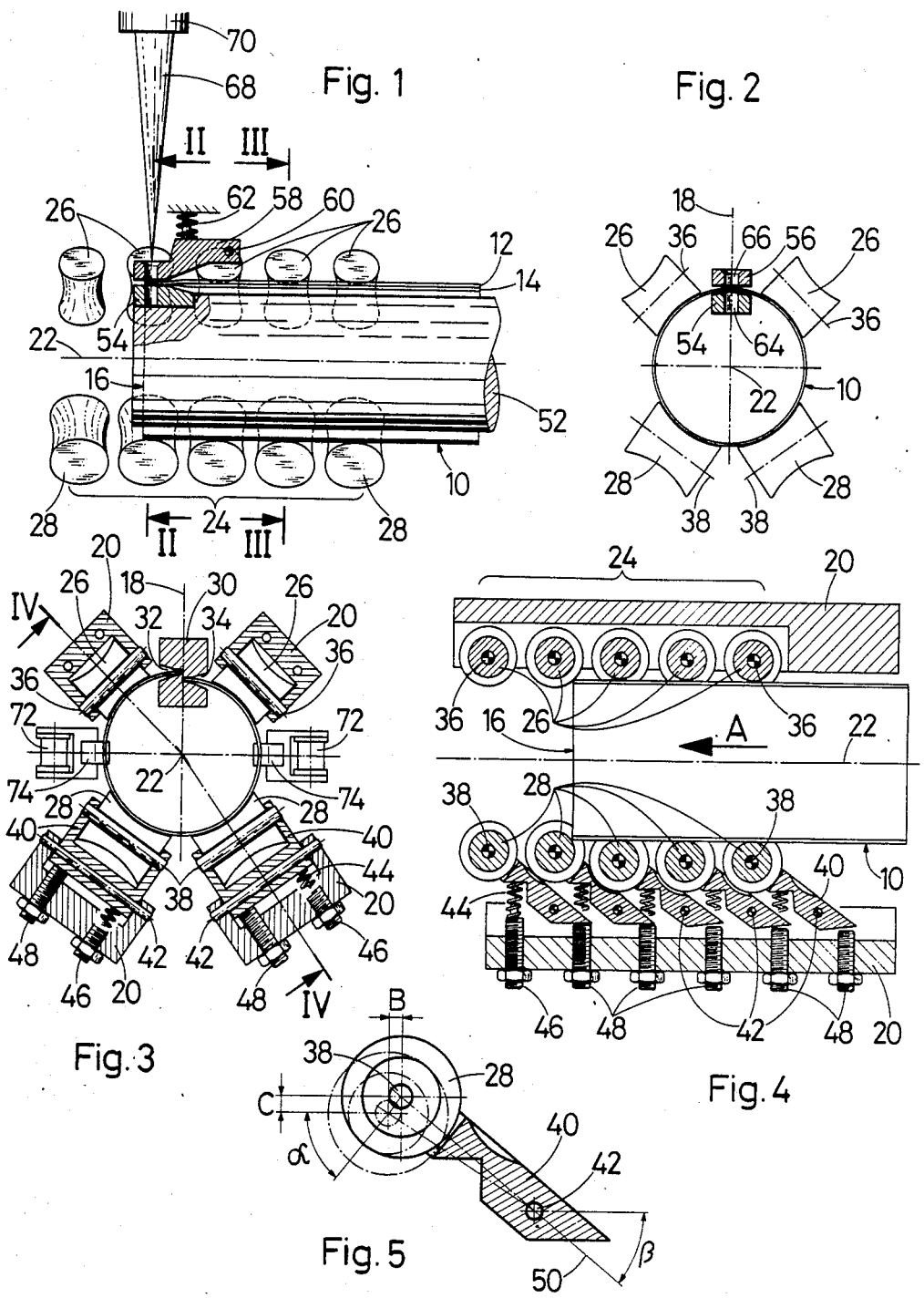

THROUGH GUIDE FOR ROUNDED BLANKS ON A SEAM WELDING MACHINE

The invention relates to a through guide for rounded blanks on a machine for welding together the longitudianal edges of the blanks, having a plurality of rings of rollers which are disposed one behind the other round a common longitudinal axis in the direction of passage of the blanks and comprise rollers of which at least some are each mounted on a roller carrier which is adjustable in the direction away from the longitudinal axis, against resilient resistance.

In a known through guide of this type (DE-OS 33 30 171), the roller carriers are of fork-like construction and each have a shank which extends radially away from the common longitudinal axis of the rings of rollers and is guided for displacement in a corresponding radial bore in a pincer-like holding means. Disposed round the shank of each roller carrier is a compression spring which tends to urge the roller carrier radially inwards, towards the common longitudinal axis. If blanks of sheet metal of small thickness, for example 0.2 mm, are moved through this known through guide in rapid succession at the rate of 500 blanks/minute for example, and accordingly at high speed, there is a danger that the leading edges of the blanks, in the direction of passage through, may be damaged by the rollers, because these cannot overcome the resistance of their resilient supporting means quickly enough to be able to give way to each individual blank sufficiently from the beginning. In order to keep the damage which the rollers leave behind on the leading edges of the blanks, at least so slight that it does not disturb the further processing of the blanks and above all does not lead to leaks in the finished sheet-metal containers, for example preserving cans, it is essential to keep the spring forces with which the roller carriers are supported appropriately low in the known through guide. This has the disadvantage, however, that it is difficult to guide the longitudinal edges of the blanks so reliably that they overlap one another precisely by a fixed amount of 0.5 mm for example, for the production of a pressure seam weld. In order to bring about such overlapping, the edges of the sheet metal are guided in grooves of a Z-section rail in the known through guide; in this case, the prescribed width of overlap can only be adhered to if each of the longitudinal edges bears reliably against the bottom of the associated groove in the rail.

Corresponding facts also apply when a through guide of the type described at the beginning is provided on a machine for the butt-welding of the longitudinal edges of rounded blanks. In this case, particular care must actually be taken to ensure that the spring forces acting on the resiliently supported roller carriers are sufficiently great for the edges of the longitudinal margins to bear against one another with sufficient pressure in the welding zone.

It is therefore the object of the invention to protect the leading edges of the blanks from damage in a through guide of the type described at the beginning even when the substantially radial forces exerted on the blanks by the rollers are sufficiently great to render possible a satisfactory welding of the overlapping or abutting longitudinal edges.

According to the invention, the problem is solved in that the roller carriers are guided in a manner which enables the rollers to execute yielding movements at an angle of distinctly less than 90° to the direction of passage through of the blanks. In other words, the roller carriers are guided so that the yeilding movements do not take place in a purely radial direction as hitherto but have an appreciable component parallel to the direction in which the blanks pass through.

It has been found that the guiding of the roller carriers according to the invention contributes substantially to avoiding damage to the leading edges of the blanks and in addition to reducing the vibrations occurring when the leading edges of the blanks impinge on the rollers.

The through guide according to the invention is preferably constructed in such a manner that the roller carriers are each pivotable about a transverse pivot pin which is disposed at least substantially parallel to the associated roller axis, upstream of this with respect to the direction in which the blanks travel through.

This form of embodiment of the invention may appropriately be further developed in that the roller carriers are two-armed levers, one arm of each of which is supported on a spring adjusting member through a spring and the other arm is associated with an adjustable stop.

The pivotable arrangement of the roller carriers may be further developed in that the transverse pivot pin, about which each of the said roller carriers is pivotable, and the associated roller spindle lie in a common plane which forms an angle of 10° to 45° with the common longitudinal axis of the rings of rollers.

The through guide according to the invention, like the known through guide described, may comprise a rail extending parallel to the longitudinal axis, on which rail guide surfaces are constructed for the longitudinal edges of the blanks. In this case, the invention is preferably carried out in such a manner that only those rollers which are not directly adjacent to the rail are mounted on a pivotable roller carrier whereas the other rollers are rigidly mounted. The rigid mounting of the other rollers does not, however, exclude the possibility that these may be adjustable radially in relation to the common longitudinal axis; it is merely a question of the fact that these rollers, with a given adjustment, cannot yield to the blanks.

Finally, the invention may be further developed in that the guide surfaces lie in a common plane containing the longitudinal axis, that disposed downstream of the rail between rigidly mounted rollers are two pressure pads through between which the longitudinal edges of the blanks can be moved for the butt-seam welding and that one of the pressure pads comprises a central opening for the passage of a laser beam and is constructed on a lever which is pivotable about a transverse pin disposed upstream of the opening and is resiliently biased towards the other pressure pad. In this case the principle of guiding according to the invention is applied to the resiliently supported pressure pad in a corresponding manner to that which it is applied to the resiliently supported roller carriers.

One example of embodiment of the invention is explained below, with further details, with reference to diagrammatic drawings.

FIG. 1 shows a side view, drawn partially in axial section, of parts of a through guide according to the invention, FIG. 2 shows the cross-section II—II of FIG. 1, FIG. 3 shows the cross-section III—III of FIG. 1, FIG. 4 shows the axial section IV—IV in FIG. 3 and FIG. 5 shows a detail from FIG. 4.

The through guide illustrated is a sub-assembly of a seam welding machine, not otherwise illustrated, for processing blanks 10 of sheet metal, particularly tin plate from 0.17 to 0.30 mm thick, which are rolled cylindrically. The blanks 10 are fed to the through guide one behind the other at short distances apart at a rate of 300 blanks/minute for example and at a speed of 10 to 15 m/minute for example. Each blank 10 has two longitudinal edges 12 and 14 which extend at right angles to a leading edge 16.

The purpose of the through guide is to guide each blank 10 so that its two longitudinal edges 12 and 14 lie precisely in an axial plane 18 which is vertical in the example illustrated. Initially, as can be seen from the right-hand portion of FIG. 1 and from FIG. 3, the two longitudinal edges 12 and 14 are offset radially in relation to one another in the axial plane 18 and are then guided so that they are directly opposite one another and bear against one another in the plane 18 in order to be thus butt-welded together—as can be seen in particular from FIG. 2.

The through guide has a substantially hollow cylindrical housing 20 with a longitudinal axis 22 which is horizontal in the example illustrated and around which a plurality of rings 24 of rollers—five in the example illustrated—are disposed at short axial distances apart. Each ring 24 of rollers comprises a pair of upper rollers 26 and a pair of lower rollers 28, all of which are diabolo-like or hourglass in shape. Ending between the two upper rollers 26 of the second ring 24 of rollers counting from the right in FIGS. 1 and 4 is a rail 30 which begins on the right outside the area of these Figures and which comprises two grooves 32 and 34 remote from one another and parallel to the longitudinal axis 22. The two grooves 32 and 34 each have a bottom situated in the plane 18; the rings 24 of rollers in the region of the rail 30 guide the longitudinal edges 12 and 14 of each blank 10 in such a manner that they bear against the bottom of the associated groove and are thus held in the axial plane 18.

The rollers 26 and 28 have roller axes 36 and 38 respectively which extend with spacing from the longitudinal axis 22, at right angles to this. The spacing of the upper roller axes 36 from the longitudinal axis 22 is invariable in operation but can be adjusted for the processing of blanks 10 of different diameters.

The lower roller spindles 38 are each secured to a forked end of a roller carrier 40, the end being the radially inner end with respect to the longitudinal axis 22. Each of these roller carriers 40 is constructed in the form of a two-armed lever and is mounted on a transverse pin 42 which is secured in the housing 20 and extends parallel to the associated roller axis 38 and thus likewise at right angles to the longtiudinal axis 22. Each of the transverse pins 42 is disposed offset radially outwards in relation to the associated roller spindle 38 and upstream with respect to the direction of passage A of the blanks 10. Thus the roller carriers 40 act like drag levers.

The arm of each roller carrier 40 on which the associated roller 28 is mounted is supported, through a spring 44, on a spring adjusting member 46 in the form of a setscrew screwed radially into the housing 20. Associated with the other arm of each roller carrier 40 is adjustable stop 48 which is likewise formed by a setscrew screwed radially into the housing 20.

The stops 48 are adjusted in such a manner that, in the state of rest before the arrival of a blank 10, all the roller carriers 40 assume a position such as is illustrated in FIG. 4 for the fourth and fifth roller carriers 40 in the direction of passage through A. In this position, the common plane 50 of the roller axis 38 and of the transverse pin 42 of the roller carrier 40 in question forms an angle $\beta$ of 10° to 45° with the longitudinal axis 22; this means that the tangent of the arc over which the associated roller spindle 36 moves on deflection out of the position of rest forms the complementary angle $\alpha = 90 - \beta$, that is to say from 80° to 45° in the present example, with the longitudinal axis 22.

Extending inside the housing 20 and coaxial with this is a stationary mandrel 52 which is secured to a machine upright on the right, outside the area of FIGS. 1 and 4. At its free, left-hand end in FIGS. 1 and 4, the mandrel 52 carries a radially inner, stationary pressure pad 54, opposite which there is a radially outer pressure pad 56. The radially outer pressure pad 56 is formed on a lever 58 which is mounted in the housing 20 for pivoting about a transverse pin 60 extending with spacing at right angles to the longitudinal axis 22 and which is loaded by a spring 62 in such a manner that the outer pressure pad 56 is biased towards the inner pressure pad 54.

The two pressure pads 54 and 56 each have an opening 64 and 66 respectively of circular cross-section, which openings extend coaxially with one another and radially in relation to the longitudinal axis 22. The purpose of the opening 66 in the outer pressure pad 56 is to afford a laser beam 68, which originates from a welding device 70, access to the abutting longitudinal edges 12 and 14 of the blank 10; the opening 64 in the inner pressure pad 54 prevents this from being excessively heated by the laser beam 68. Together, the two pressure pads 54 and 56 ensure that the two longitudinal edges 12 and 14 abut during the welding and are slightly squeezed during the steadily continued forward movement of the blank 10 in the direction of the arrow A, as a result of which the certainty that the welding seam will be completely tight is increased.

Before its leading edge 16 reaches the welding zone, each blank 10 must displace the movable lower rollers 28 of all the rings 24 of rollers out of their position of rest into a radially outer position which is shown in FIG. 4 for the first to the third rollers 28. The movement which is executed by the roller spindles 38 in the course of this, has a component B parallel to the longitudinal axis 22 and a radial component C, as illustrated in FIGS. 5. The component of movement C is necessary in order to ensure passage for the blank 10.

The component of movement B results from the angle $\beta$ selected and means that the lower roller 28 in question follows the movement of the blank 10 by which it is displaced, for a short distance. It has been found that this component of movement B makes an important contribution to alleviating the shock which results whenever the leading edge 16 of a blank 10 strikes against one of the lower rollers 28 as illustrated in FIG. 4 for the fourth roller 28 in the direction of passage through A.

Two conveyor chains 72, to which flight attachments 74 are secured, ensure the movement of the blanks in the direction of passage A.

We claim:
1. A through guide for rounded sheet-metal container body blanks (10) on a machine for welding longitudinal edges (12, 14) of the blanks (10) together, the guide having a plurality of rings (24) of rollers which rings are disposed one behind the other in the direction of passage (A) of the blanks along a common longitudinal axis (22) through the rings of rollers, at least some of the rollers (28) being mounted on roller carriers (40) which are adjustable in a direction away from the longitudinal axis (22) against resilient resistance, characterized in that the roller carriers (40) are guided in a manner which enables the rollers (28) mounted on the carriers to execute yielding movements away from the longitudinal axis (22) at an angle ($\alpha$) of distinctly less than 90° to the direction of passage (A) of the blanks (10) through the guide.

2. A through guide as claimed in claim 1, characterized in that the rollers on the roller carriers are mounted by spindles for rotation relative to the carriers; and the roller carriers (40) are each pivotable about a pivot pin (42) extending transverse to the direction of passage and disposed at least substantially parallel to the associated roller spindle (38) and upstream of the spindle with respect to the direction of passage of the blanks (10).

3. A through guide as claimed in claim 2, characterized in that the roller carriers (40) are two-armed levers, one arm of each of which is supported, through a spring (44), on a spring adjusting member (46) and the other arm is associated with an adjustable stop (48).

4. A through guide as claimed in claim 2, characterized in that the transverse pin (42) and the associated roller spindle (38) lie in a common plane (50) which forms an angle ($\beta$) of 10° to 45° with the common longitudinal axis (22) of the rings (24) of rollers.

5. A through guide as claimed in claim 1, having a rail (30) which extends parallel to the longitudinal axis (22) and on which guide surfaces are constructed for the longitudinal edges (12, 14) of the blanks (10), characterized in that only those rollers (28) which are not immediately adjacent to the rail (30) are mounted on a pivotable roller carrier (40) whereas the other rollers (26) are rigidly mounted.

6. A through guide as claimed in claim 5, characterized in that the guide surfaces of the rail (30) lie in a common plane (18) containing the longitudinal axis (22), and disposed downstream of the rail (30) between rigidly mounted rollers (26) are arranged two pressure pads (54,56) between which the longitudinal edges (12, 14) of the blanks (10) can be passed for butt welding and one of the pressure pads (56) comprises a central opening (64) for passage of a laser beam (68) and is positioned on a lever (58) which is pivotable about a transverse pin (60) disposed upstream of the opening (64) and is resiliently biased towards the other pressure pad (54).

* * * * *